United States Patent Office 3,489,783
Patented Jan. 13, 1970

3,489,783
ALKARYLOXY SUBSTITUTED HYDROXY SILANES AND SILOXANES
Alvin F. Shepard and Bobby F. Dannels, Grand Island, N.Y., assignors to Hooker Chemical Corporation, Niagara Falls, N.Y., a corporation of New York
No Drawing. Filed Sept. 6, 1966, Ser. No. 577,163
Int. Cl. C07f 7/06; C09d 7/12; C08g 1/22
U.S. Cl. 260—448.8                     11 Claims

ABSTRACT OF THE DISCLOSURE

Silanes of the formula:

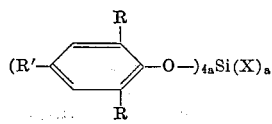

wherein R is alkyl of 4 to 18 carbon atoms or aralkyl of 7 to 18 carbon atoms, R' is —H, halogen, alkyl of 4 to 18 carbon atoms or aralkyl of 7 to 18 carbon atoms, X is halogen or —OH, and $a$ is 0–3; and siloxanes, the simplest member being of the formula:

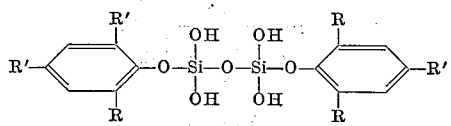

wherein R and R' are defined above, useful as paint additives and capping reagents for polymers.

---

This invention relates to novel silanes and siloxanes. More particularly, this invention relates to novel aryloxy silanes and siloxanes.

Although some aryl esters of silicic acid have been previously known and found to be of low cost and possess remarkable heat stability, such esters have found little utility because of their hydrolytic instability upon exposure to moisture. Furthermore, the known partial esters of silicic and polysilicic acids have not been utilized because of their tendency to gel on storage or on exposure to moisture or heat. Accordingly, it is an object of this invention to prepare novel aryloxy silanes aryloxy siloxanes which possess desirable hydrolytic stability as well as gel resistance upon exposure to moisture or heat. Other and further objects will be apparent to those skilled in the art from the following detailed description.

The aryl esters of this invention may be characterized by the formula:

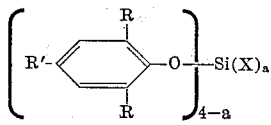

wherein R is selected from the group consisting of alkyl of 4 to 18 carbon atoms, preferably tertiary alkyl of 4 to 12 carbon atoms, and aralkyl of 7 to 18 carbon atoms, preferably of 7 to 12 carbon atoms, R' is selected from the group consisting of hydrogen, halogen, preferably chlorine or bromine, alkyl of 4 to 18 carbon atoms, preferably tertiary alkyl of 4 to 12 carbon atoms, aralkyl of 7 to 18 carbon atoms, preferably of 7 to 12 carbon atoms, and X is independently selected from the group consisting of halogen, preferably chlorine or bromine, and hydroxy and $a$ is from 0 to 3.

The siloxanes of this invention may be characterized as being prepared by the controlled hydrolysis of the monoaryloxy silanes represented by the formula:

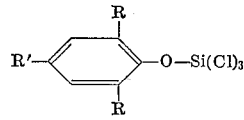

wherein R and R' are as previously described. The simplest of the siloxanes being of the formula:

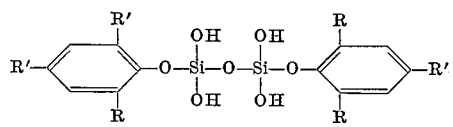

More particularly, the silovanes of this invention may be characterized as compounds whose silicon atoms are linked together through oxygen and have substituted thereon in the unlinked positions hydroxyl groups and organic radicals represented by

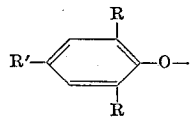

wherein R and R' are as previously described.

Typical examples of the compound characterized above are 2,4,6-tri-t-butylphenoxy trichloro silane, bis(2,4,6-tri-t-butylphenoxy) dichloro silane, tris(2,4,6-tri-t-butylphenoxy) chloro silane, tetra(2,4,6-tri-t-butylphenoxy) silane, 2,4,6-tri-t-butylphenoxy silane triol, bis(2,4,6-tri-t-butylphenoxy) silane diol, tris(2,4,6-tri-t-butylphenoxy) hydroxy silane, 2,6-di-t-butylphenoxy trichloro silane, bis-(2,6-di-t-butyl-4-chlorophenoxy) dichloro silane, the bis-(2,4,6-tri-t-butylphenyl) ester of disilicic acid, the bis(2,4-di-t-butyl-4-chlorophenyl) ester of disilicic acid, the bis-(2,4-di-t-butyl-4-bromophenyl) ester of disilicic acid, the 2,4,6-tri-t-butylphenyl ester of polysilicic acid, the 2,6-tri-t-butylphenyl ester of polysilicic acid and the like.

It has been found that by reacting phenols substituted in at least the 2 and 6 positions with organic groups containing at least four carbon atoms, preferably those possessing tertiary carbon atoms, with a silicon tetrahalide under conditions which facilitate the removal of the by-product halogen acid formed during the reaction, an aryl silicohalidite is obtained which then may be hydrolyzed to a stable aryloxy silan-mono-, di-or tri-ol or to an aryloxy siloxane. The compounds of the invention are preferably prepared by reacting a di- or tri-substituted phenol having substituted thereon groups having at least four carbon atoms with a silicon tetrahalide in the presence of an acid acceptor. The acid acceptor aids in the removal of the halogen acid formed during the reaction, which in turn increases the rate of reaction. A tertiary amine may be utilized as the acid acceptor in either stoichiometric or in excess of stoichiometric amounts.

Other procedures which may be utilized for the removal of halogen acid are:

(1) Use of sodium or other salt of the di- or tri-substituted phenol utilized in the reaction with the silicon tetrahalide;
(2) Use of amines such as pyridine, quinoline, tributylamine and the like;
(3) Addition of insoluble basic substances such as lime and the like; and
(4) Prolonged heating of the reactant phenol with the silicon tetrahalide.

As the silicon tetrahalide in the novel process of this invention, there may be used silicon tetrafluoride, silicon tetraiodide, silicon tetrabromide, silicon tetrachloride, mixed halides such as silicon bromotrichloride, silicon bromodichloride, silicon tribromochloride, silicon iodotrichloride, silicon fluorodichloride, silicon fluorobromodichloride or the like. For the purposes of this invention, it is preferred to utilize silicon tetrachloride or silicon tetrabromide.

As the substituted phenols or salts thereof, there may be used compounds characterized by the formula:

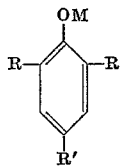

wherein R and R' are as previously described and M is selected from the group consisting of hydrogen, ammonium, alkali metal, such as lithium, sodium and potassium, and alkaline earth metal such as magnesium, calcium, strontium and barium.

Typical non-limiting examples of the substituted phenols used in the practice of the invention are the following.

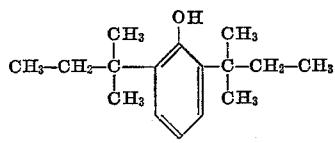

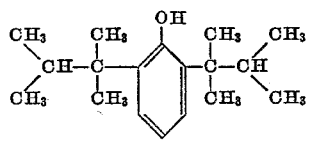

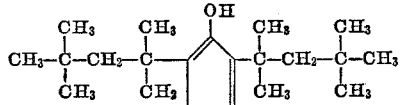

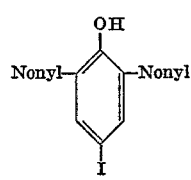

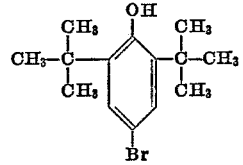

2 6-di-t-butyl-4-methylphenol

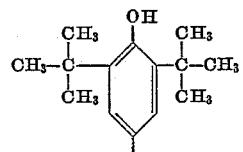

2,6-di-t-butyl-4-chlorophenol

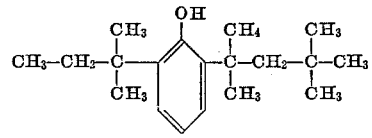

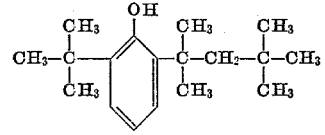

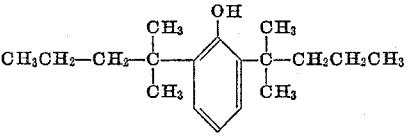

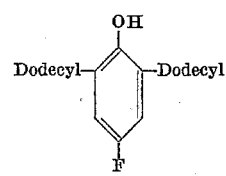

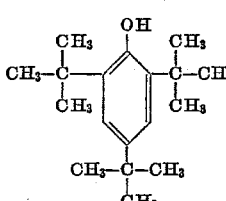

2, 4, 6-tri-t-butylphenol

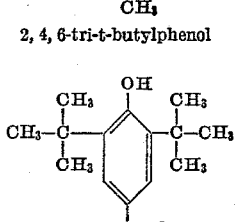

2, 6-di-t-butyl-o4-nnylphenol

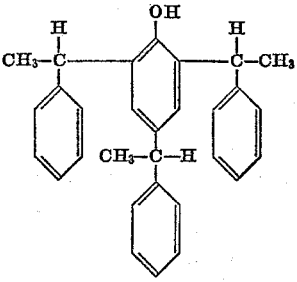

tri(phenylethyl) phenol, and the like.

Typical non-limiting examples of the salts of the substituted phenols utilized in the practice of this invention include the ammonium, alkali metal and alkaline earth metal salts of the substituted phenols mentioned above.

It has been found that phenols substituted in the 2,4,6-position react to yield preferred products of high stability to hydrolysis.

The temperature at which the aryl esters of this invention are prepared are in the range of 0 degrees centigrade to 350 degrees centigrade with the upper temperature being lower than the boiling point of the silicon tetrahalide used. It is preferred to employ temperatures in the range of 25 degrees centigrade to 325 degrees centigrade. Usually, the reaction is conducted at atmospheric pressure. However, it is also within the scope of this invention to utilize superatmospheric or subatmospheric pressures.

As set forth in the formula characterizing the aryl esters, it is possible to prepare silicic mono-, di-, tri- and tetra-aryloxy silanes. However, it is preferred to prepare the mono-, di- and tri-aryloxy silanes. Conveniently, the aryl substitution on the silicic acid may be controlled by the ratio of reactants utilized. Thus, it is possible generally to utilize from 0.1 to 10 molar proportions of substituted phenol to a one molar proportion of silicon tetrahalide employed. Preferably, 0.5 to 4 molar proportions of substituted phenol to a molar proportion of silicon tetrahalide are reacted. An excess of either reactant may be utilized depending upon the type of substitution desired.

Thus, according to this invention, when it is desired to prepare a monoaryloxy silane, preferably from about 1.1 to 4 molar proportions of silicon tetrahalide to a molar proportion of substituted phenol are employed, when it is desired to prepare a diaryloxy silane, preferably from about 2 to 4 molar proportions of substituted phenol to a molar proportion of silin tetrahalide are employed; and when it is desired to prepare triaryloxysilanes and tetraaryloxysilanes, preferably, from about 3 to 6 molar proportions of substituted phenol to a molar proportion of silicon tetrahalide are employed in conjunction with temperatures in the range of 150 degrees centigrade to about 350 degrees centigrade.

When preparing other than the tetraaryloxy silane, the reaction of the substituted phenol and the silicon tetrahalide produces the corresponding silicohalidite. Thus, in order to produce the desired hydroxy silane, it is necessary to hydrolyze the product. Such hydrolysis may be effected in any of several known methods. Among these methods are hydrolysis with water, acidic solution and the like. The least effective method is hydrolysis with water because of the prolonged periods of contact required due to exceptional hydrolytic stability of the novel compounds of this invention.

The disilicic and polysilicic esters according to this invention are prepared by the controlled hydrolysis of the silicic monoester with water, acidic solution or the like. Polysilicic esters are those having 3 or more silicon atoms in the molecule.

The separation of the desired aryloxy silane and aryloxy siloxane may be accomplished in any of several known ways. Non-limiting examples of these methods includes distillation, filtration, crystallization, and the like.

The novel compounds of this invention are particularly useful paint additives, imparting hardness and gloss and improving adhesion and corrosion resistance. Additionally, the compounds of this invention may be utilized as thermally stable intermediates for polymers and elastomers, as well as end-capping reagents for polyaldehydes and other unstable polymers, particularly in conducting known polymerization reaction of formaldehyde with the monohydroxy and dihydroxy esters of this invention.

The following non-limiting examples further illustrate the invention. All parts are by weight and all temperatures are in degrees centigrade, unless otherwise mentioned.

Example 1.—Preparation of bis(2,4,6-tri-t-butylphenoxy) dichloro silane

A reactor was fitted with a stirrer, thermometer, reflux condenser and protected by drying tubes. After flushing with nitrogen, 131 parts of 2,4,6-tri-t-butylphenol and 300 parts of diethylene glycol dimethyl ether were added to the reactor and the mixture was heated to 100 degrees centigrade. Eleven and a half parts of sodium cut into small pieces were slowly added to the mixture with continued heating over a four-hour period until all the sodium dissolved. Twenty-one parts of silicon tetrachloride dissolved in 100 cc. of diethylene glycol dimethyl ether was then added dropwise over a one and one quarter hour period at a temperature of 100–105 degrees centigrade. The temperature was then slowly raised to and maintained at 150 degrees centigrade for a period of 17 hours. After cooling to room temperature, the reaction mixture was poured into a mixture of ice and water. The resulting solids were dissolved in n-hexane. A small amount of insoluble material that remained was removed by filtration. After evaporation of the solvent, the residue was washed with acetone and resulted in the recovery of 48 parts of a colorless crystalline solid—bis(2,4,6-tri-t-butylphenoxy) dichloro silane—having a melting point of 200–201 degrees centigrade. The product was analyzed and found to contain 69.0 percent carbon, 9.56 percent hydrogen, 5.1 percent silicon and 11.3 percent chlorine. The calculated percentages of these elements in

$$C_{36}H_{58}O_2SiCl_2$$

are: 69.6 percent carbon, 9.38 percent hydrogen, 4.5 percent silicon and 11.4 percent chlorine. The product was unaffected by boiling with water for one hour. Three days of refluxing with a mixture of 0.1 N HCl and acetone resulted in 50–60 percent hydrolysis of the Si—Cl bonds. The Si—O—C bonds were unaffected.

Upon replacement of the 2,4,6-tri-t-butylphenol of Example 1 with an equimolar proportion of a compound such as 2,6 - di - t - butylphenol, 2,6 - di - t - butyl-4-methylphenol, 2,6 - di - t - butyl - 4 - chlorophenol, tris(phenylethyl) phenol, 2,4,6 - tri - t - amylphenol, 2,6 - di - t - amylphenol, 2,4,6 - tri(1,1,2,2 - tetramethylethyl) phenol, 2,6 - di - (1,1,2,2,tetramethylethyl) phenol, or the like, the corresponding dichlorosilane is obtained.

When the silicon tetrachloride of Example 1 is replaced by an equimolar proportion of a compound such as silicon tetrabromide, silicon tetrachloride, silicon tetraiodide, silicon fluorodichloride, silicon iodotrichloride or the like, the corresponding dihalosilane is obtained.

Example 2.—Preparation of bis(2,4,6-tri-t-butylphenoxy) dibromo silane and tris(2,4,6-tri-t-butylphenoxy) bromo silane Utilizing the apparatus and procedure of Example 1, 131 parts of 2,4,6 - tri- t - butylphenol and 200 parts of diethylene glycol dimethyl ether were mixed together. Eleven parts sodium cut into small pieces were slowly added to the mixture. Thereafter, over a two-hour period, 52 parts of silicon tetrabromide were added to the mixture maintained at a temperature of 100 degrees centigrade. After the addition, the reaction mixture was slowly raised to and maintained at 150 degrees centigrade for a period of 20 hours. Subsequently, the mixture was cooled and poured into 700 parts of a mixture of ice and water. The solid produced was removed by filtration and washed five times with 750 part portions of hot acetone. The acetone-insoluble material weighed 10 parts. Recrystallization from hexane produced tris(2,4,6-tri-t-butylphenoxy) bromo silane having a melting point of 315–316 degrees centigrade. The product was analyzed and found to contain 8.2 percent bromine and 3 percent silicon. The theoretical amounts of these elements in $C_{54}H_{81}O_3SiBr$ are: 8.9 percent bromine and 3.1 percent silicon.

The cooled washes of acetone produced bis(2,4,6-tri-t-butylphenoxy) dibromo silane which after recrystallization from hexane had a melting point of 204–207 degrees centigrade. This product was analyzed and found to contain 22.6 percent bromine and 4.1 percent silicon. The theoretical amounts of these elements in $C_{36}H_{54}O_2SiBr_2$ are: 22.5 percent bromine and 3.95 percent silicon.

Tris(2,4,6-tri-t-butylphenoxy) bromo silane was boiled with water for 13 days with no generation of acidity and no change in melting point.

Bis(2,4,6 - tri - t - butylphenoxy) dibromo silane was boiled with water for 13 days. The acid generated indicated 50–60 percent hydrolysis of the Si—Br bonds.

Example 3.—Preparation of bis(2,4,6-tri-t-butylphenoxy) difluorosilane

Utilizing the apparatus and procedure of Example 1, 71 parts of sodium 2,4,6-tri-t-butylphenate were prepared in 100 parts diethylene glycol dimethyl ether. Into this mixture, at a temperature of 100 degrees centigrade, was bubbled silicon tetrafluoride at the rate of 7.28 parts over a period of 2.5 hours. The weight increase of the material was 17.5 parts. Thereafter, the temperature was raised to and maintained at 150 degrees centigrade for a period of 17 hours. After cooling, the mixture was suspended in 400 parts of water. A small amount of insoluble material was recovered by filtration. The organic phase was separated and evaporated. The remaining solid residue was washed with cold acetone and 37 parts of crystalline product were recovered. After recrystallization from dimethoxyethane, the product—bis(2,4,6 - tri-t-butylphenoxy) difluoro silane—had a melting point of 158–160.5 degrees centigrade. The product was analyzed and found to contain 73.85 percent carbon, 9.97 percent hydrogen and 6.43 percent fluorine. The calculated percentages of these elements in $C_{36}H_{58}O_2SiF_2$ are: 73.4 percent carbon, 9.94 percent hydrogen and 6.46 percent fluorine.

Example 4.—Preparation of bis(2,4,6-tri-t-butylphenoxy) silane diol

Five parts of the bis(2,4,6-tri-t-butylphenyl) dichloro silane were placed in a flask with 150 parts 0.1 N HCl and 119 parts of acetone. This mixture was heated at reflux for 24 days. After cooling, sufficient hexane was added to dissolve the solid. The organic phase was separated and evaporated to dryness. The solid residue—bis(2,4,6-tri-t-butylphenoxy) silane diol—was crystallized from acetone and had a melting point of 188.5–190.5 degrees centigrade. The product was analyzed and found to contain 73.5 percent carbon, 10.38 percent hydrogen and 0.0 percent chlorine. The molecular weight was 583. The calculated percentages of these elements in $C_{36}H_{60}O_4Si$ are: 73.8 percent carbon, 10.3 percent hydrogen, 0 percent chlorine and 584.9 molecular weight. The infrared spectrum had a band at 2.7 which is indicative of the presence of OH groups.

Example 5.—Preparation of 1,3-di(2,4,6-tri-t-butylphenyl) disiloxane-1,3-tetrol

Utilizing the apparatus and procedure of Example 1, 142 parts of sodium 2,4,6-tri-t-butylphenate were mixed in 200 parts of diethylene glycol dimethyl ether. This solution was heated to and maintained at 100 degrees centigrade to prevent solidification and slowly added to 340.5 parts of silicon tetrachloride in a separate reactor over a three-hour period. The temperature of this reactor was maintained at 5–15 degrees centigrade with an ice bath. Thereafter, the reaction mixture was allowed to warm up to room temperature and stand for 16 hours. Unreacted silicon tetrachloride was removed by distillation, vacuum being applied to remove the last traces. The reaction mixture was suspended in 1,318 parts of n-hexane. A saturated solution of sodium bicarbonate was added to adjust the pH to approximately 8. The insoluble solid phase was removed by filtration. Thirty-four grams of tri-t-butylphenol were recovered from the hexane phase of the filtrate. The insoluble solid phase was dissolved in diethyl ether. A small amount of insoluble matter was filtered off. After concentrating this solution, 25 parts of white crystalline solid was removed by filtration. Upon crystallization from a hot benzene solution, a solid—the 1,3-di(2,4,6-tri-t-butylphenyl) disiloxane-1,3-tetrol—was obtained having a melting point of 180–185 degrees centigrade. The product was analyzed and found to contain 65.6 percent carbon, 9.53 percent hydrogen and 8.51 percent silicon. The molecular weight was 642. The calculated percentages of these elements in $C_{36}H_{62}O_7Si_2$ are: 65.2 percent carbon, 9.42 percent hydrogen and 8.48 percent silicon. The calculated molecular weight is 663.06. Its infrared spectrum showed the presence of OH groups.

Example 6.—Preparation of the poly(2,4,6-tri-t-butylphenoxy) polysiloxane

The mother liquor from the filtration of the product of Example 5 was diluted with methanol. A white solid was filtered off and washed with methanol. This product was soluble in hot hexane, benzene, and acetone. The product—the poly(2,4,6 - tri - t - butylphenoxy) polysiloxane—was analyzed and found to contain 48.3 percent carbon, 7.06 percent hydrogen and 17.68 percent silicon. The molecular weight was 1,900. The calculated percentages of these elements in $C_{72}H_{128}O_{32}Si_{12}$ are: 47.1 percent carbon, 7.01 percent hydrogen and 18.27 percent silicon. The calculated molecular weight is 1,843.

Example 7.—Vinyl chloride stabilization

A sample was prepared by admixing on rolls 5 parts of polyvinyl chloride, 2.2 parts of dioctylphthalate, 0.025 part of bis(2,4,6-tri-t-butylphenoxy) silane diol, and 0.1 part of barium-cadmium laurate. A control sample was prepared without the silane diol. Specimens of the samples were heated in an oven maintained at 175 degrees centigrade.

Upon exposure to heat, the results given in Table I were observed:

TABLE I

| Additive | Discoloration after exposure for— | | | |
|---|---|---|---|---|
| | 0.5 hour | 1 hour | 1.5 hours | 2.5 hours |
| 2, none | None | Faint | Moderate | Black. |
| 1, bis(2,4,6-tri-t-butylphenoxy) silane diol. | do | None | None | Faint. |

Example 8.—Lubricant additives

The lubricant additive properties of bis(2,4,6-tri-t-butylphenoxy) dichloro silane were demonstrated utilizing the Falex oil testing machine which measures the torque resulting when grooved steel blocks forming jaws are pressed against a rotating pin while bathed in the oil being tested. An initial run at a light load is made in order to give the oil a chance to initiate a film-building action, and then the load is progressively increased by means of a ratchet which acts on a toothed wheel to tighten the jaws. The load is measured in pounds. Results of the tests are given in Table II:

TABLE II

| Additive | Concentration weight percent in oil[1] | Final Jaw Load |
|---|---|---|
| None | 0 | Failed in 30 seconds at 750 pounds. |
| Bis(2 4 6-tris-t-butylphenoxy) dichloro silane. | 2 | Seizure or failure occurred at 1,450 pounds. |

[1] Sun 96 (Gulf Coastal), Saybolt 2,000 at 100 degrees Fahrenheit and 87 at 210 degrees Fahrenheit.

What is claimed is:
1. A compound of the formula

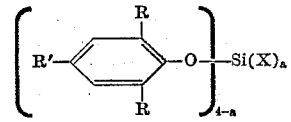

wherein R is selected from the group consisting of alkyl of 4 to 18 carbon atoms and aralkyl of 7 to 18 carbon atoms, R' is selected from the group consisting of hydrogen, halogen, alkyl of 4 to 18 carbon atoms and aralkyl of 7 to 18 carbon atoms, X is selected from the group consisting of halogen and hydroxy, and $a$ is 0 to 3.

2. According to claim 1, the compound bis(2,4,6-tri-t-butylphenoxy) dichloro silane.

3. According to claim 1, the compound bis(2,4,6-tri-t-butylphenoxy) difluoro silane.

4. According to claim 1, the compound mono(2,4,6-tri-t-butylphenoxy) trichloro silane.

5. According to claim 1, the compound bis(2,4,6-tri-t-butylphenoxy) dihydroxy silane.

6. A compound of the formula

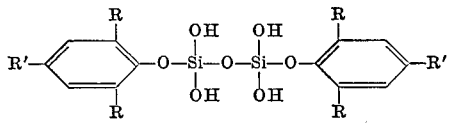

wherein R is selected from the group consisting of alkyl of 4 to 18 carbon atoms and aralkyl of 7 to 18 carbon atoms, and R' is selected from the group consisting of hydrogen, halogen, alkyl of 4 to 18 carbon atoms and aralkyl of 7 to 18 carbon atoms.

7. According to claim 6, the compound 1,3-di(2,4,6-tri-t-butylphenoxy)disiloxane 1,3-tetrol.

8. A siloxane, whose silicon atoms are linked together through oxygen and have substituted thereon in the unlinked positions hydroxyl groups and organic radicals represented by

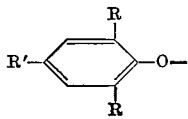

wherein R is selected from the group consisting of alkyl of 4 to 18 carbon atoms and aralkyl of 7 to 18 carbon atoms and R' is selected from the group consisting of hydrogen, halogen, alkyl of 4 to 18 carbon atoms, and aralkyl, prepared by reacting a substituted phenol of the formula:

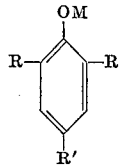

wherein R and R' are as previously described, and M is selected from the group consisting of hydrogen, ammonium, and an alkali metal with an excess of a silicon tetrahalide utilizing an acid acceptor when M is hydrogen, thereafter hydrolyzing the reaction mixture and recovering the desired siloxane.

9. A compound according to claim 8 wherein 2 to 4 molar proportions of silicon tetrahalide to a molar proportion of substituted phenol are employed.

10. A compound according to claim 9 wherein the reaction is conducted at a temperature in the range of 0 degree centigrade to 350 degrees centigrade.

11. A compound according to claim 10 wherein the substituted phenol is 2,4,6-tri-t-butylphenol.

References Cited

UNITED STATES PATENTS

| | | | |
|---|---|---|---|
| 2,963,502 | 12/1960 | Wilson | 260—448.8 |
| 3,328,350 | 6/1967 | Omietanski et al. | 260—448.8 X |

OTHER REFERENCES

Eaborn, "Organosilicon Compounds," Academic Press Inc., N.Y. (1960), pp. 288–293.

Bazant et al.: "Organosilicon Compounds," vol. 1, Academic Press Inc., N.Y. (1965), pp. 41–42 and 51–54.

Eaborn, "Organosilicon Compounds," Academic Press Inc., N.Y. (1960), pp. 2 to 9.

TOBIAS E. LEVOW, Primary Examiner

P. F. SHAVER, Assistant Examiner

U.S. Cl. X.R.

106—14; 260—46.5

PO-1050
(5/69)

UNITED STATES PATENT OFFICE
CERTIFICATE OF CORRECTION

Patent No. 3,489,783                    Dated January 13, 1970

Inventor(s)   Alvin F. Shepard and Bobby F. Dannels

It is certified that error appears in the above-identified patent and that said Letters Patent are hereby corrected as shown below:

Column 1, line 15, in the structural formula, delete subscript "4a" and insert --- 4-a ---;

Column 2, line 16, delete "silovanes" and insert --- siloxanes ---;

Column 3, line 40, on the left side of the structural formula of phenol, correct the substituent to appear

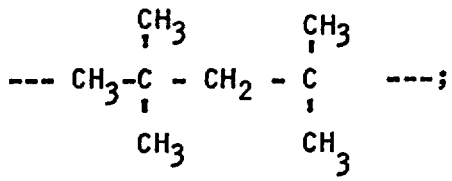

Column 3, line 65, delete "26" and insert --- 2,6 ---;
Column 4, line 1, the substituent on the right side of the phenol structure should appear

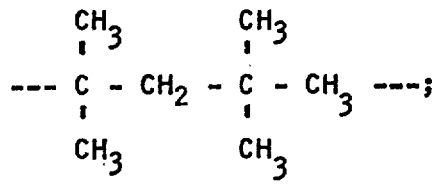

Column 4, line 45, delete "-04-nnyl phenol", and insert --- 4-nonylphenol ---
Column 5, line 24, delete "silin" and insert --- silicon ---;
Column 8, line 35, delete the number of the additives experiments "$^2_1$," and insert --- $^1_2$, ---;
Column 8, line 58, delete "pouuds" and insert --- pounds ---;

SIGNED AND
SEALED
AUG 18 1970

(SEAL)
Attest:

Edward M. Fletcher, Jr.
Attesting Officer

WILLIAM E. SCHUYLER, JR.
Commissioner of Patents